April 4, 1967  F. E. MARKS ETAL  3,312,251
LAY-IN DUCT FOR ELECTRICAL WIRING
Filed Jan. 21, 1964  3 Sheets-Sheet 1
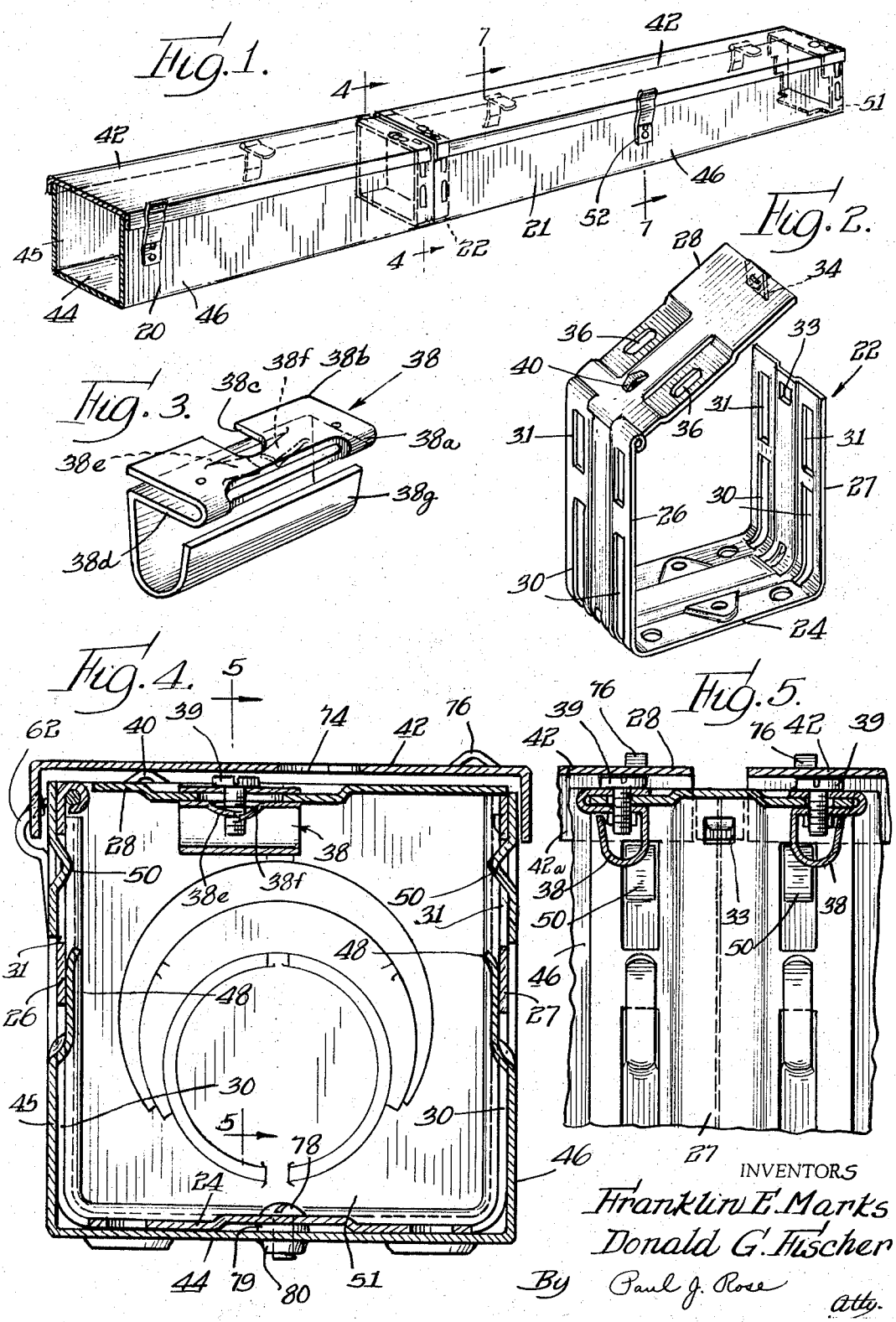
INVENTORS
Franklin E. Marks
Donald G. Fischer
By Paul J. Rose
Atty.

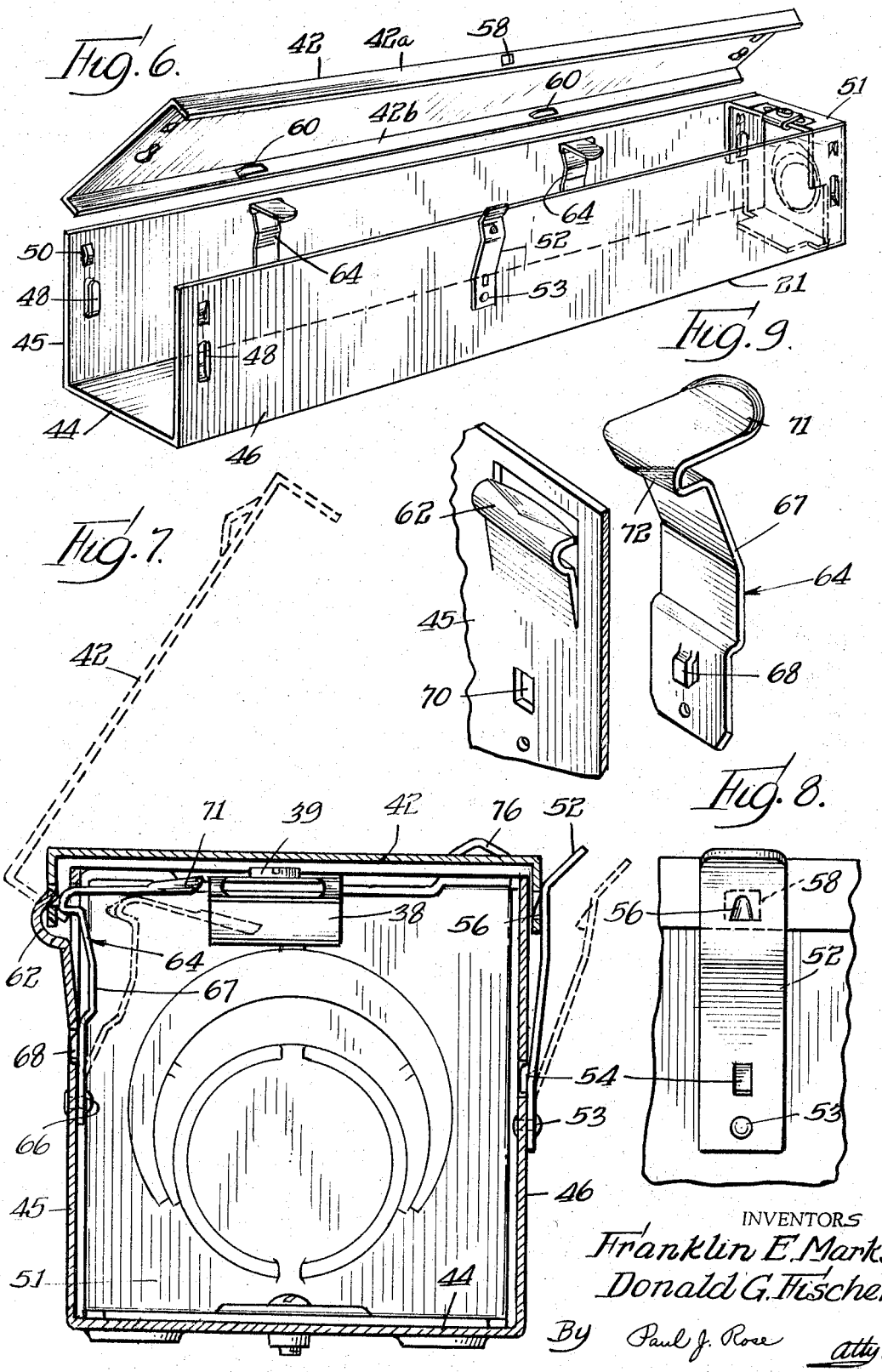

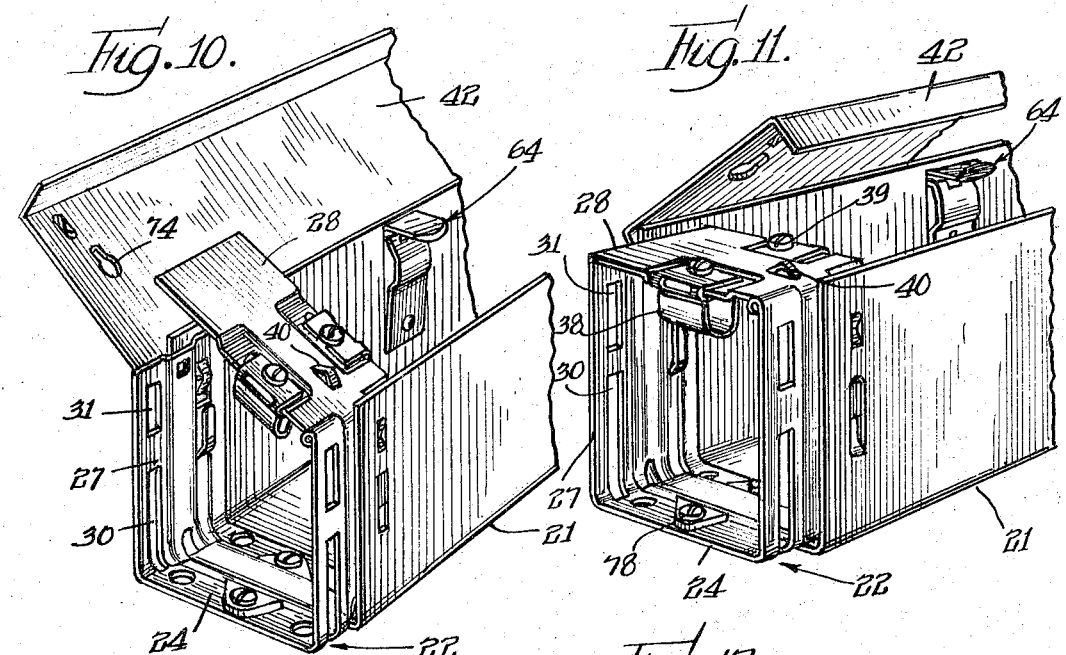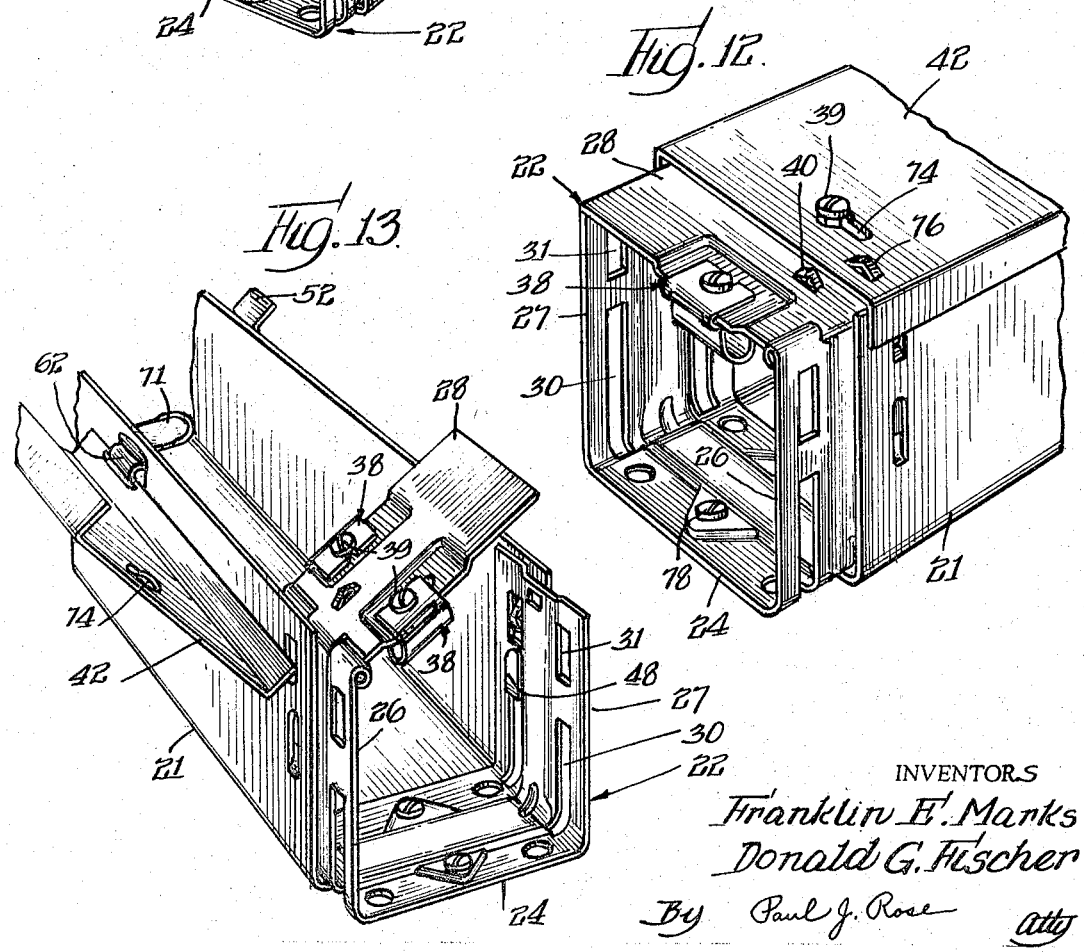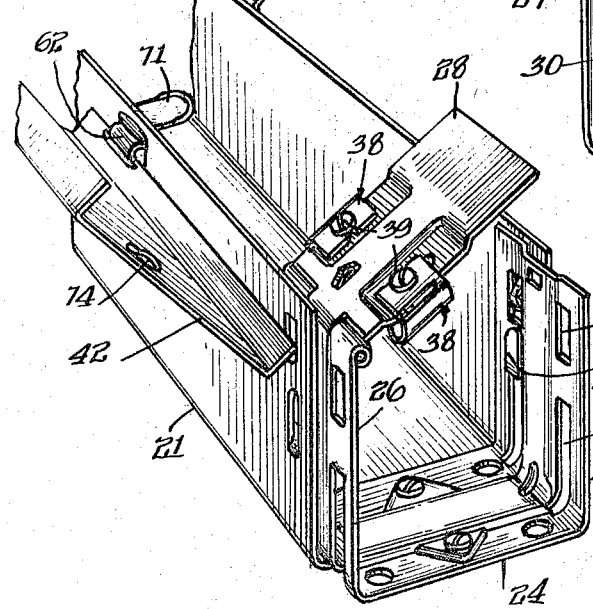

United States Patent Office 3,312,251
Patented Apr. 4, 1967

3,312,251
LAY-IN DUCT FOR ELECTRICAL WIRING
Franklin E. Marks and Donald G. Fischer, Lexington, Ky., assignors to Square D Company, Park Ridge, Ill., a corporation of Michigan
Filed Jan. 21, 1964, Ser. No. 339,246
18 Claims. (Cl. 138—158)

This invention relates generally to wiring duct of the lay-in type, in which the tops of connected duct sections may be opened so that wires may be laid in the duct rather than pulled through the ends of the duct.

It may sometimes be desirable that connected sections of lay-in duct be provided with covers which are completely removable from the respective duct sections but may be secured in place thereon by screws. At other times it may be desirable that connected sections of lay-in duct be provided with covers which are hinged to the respective duct sections. Prior to this invention, it was necessary for a manufacturer to make and stock two different kinds of sections of lay-in duct, one kind with completely removable covers securable on the respective duct sections by screws (screw-cover duct) and the other kind with covers hinged to the respective duct sections (hinge-cover duct).

An object of this invention is to provide a single construction for lay-in duct which selectively fulfills the requirements of both screw-cover and hinge-cover duct.

Another object is to provide an improved connector for joining sections of lay-in duct.

In the accompanying drawings,

FIG. 1 is a perspective view of a section of lay-in duct constructed in accordance with the invention and a portion of another duct section connected thereto, a connector between the two sections being shown in dotted lines;

FIG. 2 is a perspective view of the connector of FIG. 1 without the captive nuts and screws;

FIG. 3 is a perspective view of one of the captive nuts of the connector of FIG. 1;

FIG. 4 is an enlarged sectional view taken substantially along the line 4—4 of FIG. 1 and illustrating the hinge-cover arrangement of the connector with respect to the duct sections, certain portions being omitted for clarity;

FIG. 5 is a fragmentary sectional view taken along the line 5—5 of FIG. 4;

FIG. 6 is a perspective view of a duct section of FIG. 1 with the cover disconnected therefrom;

FIG. 7 is an enlarged sectional view taken along the line 7—7 of FIG. 1, certain portions being omitted for clarity FIG. 8 is a fragmentary view looking from the right of the duct section of FIG. 7 and showing the front of the latch;

FIG. 9 is an exploded fragmentary perspective view showing one of the separable hinges of a duct section;

FIG. 10 is a fragmentary perspective view of a duct section of FIG. 1 illustrating the screw-cover arrangement of the connector with respect to the duct sections and showing the duct cover and connector cover in raised position;

FIG. 11 is a view similar to FIG. 10 but showing the connector cover in closed position;

FIG. 12 is a view similar to FIG. 11 but showing the duct cover in closed position; and FIG. 13 is a fragmentary perspective view of a duct section of FIG. 1 and illustrates the hinge-cover arrangement of the connector with respect to the duct sections.

FIG. 1 discloses a pair of duct sections 20 and 21 constructed in accordance with the invention and connected by a connector 22 constructed in accordance with the invention. The connector 22 is shown best in FIG. 2 and includes a channel-shaped body portion having a bottom portion 24 and a pair of opposed leg portions 26 and 27. A connector cover 28 is pivotally connected to the free end portion of the leg portion 26.

Each of leg portions 26 and 27 has two pairs of slots 30 and 31 through which, as hereinafter explained, portions of the duct sections 20 and 21 extend when the duct sections are connected to the connector. The leg portion 27 has an aperture 33 adjacent its free end for cooperation with a latching tongue 34 on the free end of the connector cover 28. A pair of slots 36 is provided in the connector cover 28 for cooperation respectively with a pair of captive nuts and screws such as the formed nut or clip 38 shown best in FIG. 3 and screws 39 shown in FIGS. 4, 5, and 10–13. A seal lance 40 is also provided in the connector cover 28 for use as explained hereinafter.

Each formed nut or clip 38 includes a generally U-shaped attaching portion 38a including a leg 38b having a slot 38c and a leg 38d having a pair of bent resilient tangs 38e and 38f. One of the screws 39 is received in the slot 38c and threaded between the tangs 38e and 38f after the clip has been inserted over a portion of the connector cover 28 having a slot 36. A generally U-shaped screw shielding and handle portion 38g depends from the free end of the leg 38d. The bight portion of the attaching portion 38a is cut away as shown.

Each of the duct sections 20 and 21 includes a flanged duct cover 42 and a channel-shaped body portion having a bottom portion 44 and a pair of opposed side portions 45 and 46. The opposite end portions of each of the side portions 45 and 46 are provided with inwardly offset tongue portions 48 which are received in the slots 30 of connectors such as the connector 22 and are also provided with inwardly lanced projections 50 which are received in the slots 31 of connectors such as the connector 22 when the duct sections are connected together by connectors, as shown best in FIGS. 4 and 5. It will be understood that the tongue portions 48 and projections 50 are also adapted to cooperate with fittings other than the connector 22, such as an end closure 51 shown at the right end of the duct section 21 in FIGS. 1 and 6 and having knock-out portions as shown in FIGS. 4 and 7, and also having a captive nut 38 and screw 39. The tongue portions 48 and projections 50 at the right end of the duct section 21 are omitted in FIG. 7 for clarity.

The side portion 46 of each duct section is provided with a resilient cover latch member 52 shown best in FIGS. 7 and 8 and secured to the side portion 46 as by a rivet 53 and prevented from turning on the rivet by an offset tongue portion 54 received in an aperture in the side portion 46. A projection 56 on the cover latch member 52 is received in an aperture 58 in a flange 42a (FIG. 6) of the associated cover 42.

The covers 42 are pivotally mounted on the side portions 45 of the respective duct sections by hinges which are constructed to enable the covers to be easily removed if desired. Thus, each cover 42 is provided with at least two mounting apertures 60 (FIG. 6) in a flange 42b opposite the flange 42a, the free end portions of the flange 42b adjacent the mounting apertures 60 forming integral hinge bar portions of the cover, and corresponding hinge curls or generally semi-circular hinge portions 62, shown best in FIG. 9, are formed integrally with the side portion 45 of the associated duct section. The hinge curls 62 extend outwardly from the side portion 45 toward the free end portion thereof and back inwardly toward the side portion 45, the free end portions of the hinge curls ending short of or being spaced outwardly from the side portion 45 to enable the flange 42b of the cover 42 to be inserted therebetween for reception of the hinge curls 62 in the apertures 60. The cover 42 is normally held on the hinge curls 62 of the duct section by means of cooperating generally L-shaped hinge springs or resilient hinge lock members 64 such as shown in FIG. 9. The hinge springs 64 are secured to the inner surface of the side portion 45 in any suitable manner, such as by rivets 66 (FIG. 7) extending respectively through leg portions 67 of the respective hinge springs and offset tongue portions 68 received respectively in apertures 70 in the side portion 45 to prevent turning of the hinge springs on the rivets.

Each hinge spring 64 is provided with an operating leg portion 71 and a locking projection 72 adjacent the junction of the leg portions 67 and 71 thereof. The locking projections 72 extend through apertures provided in the side portion 45 by the forming of the hinge curls 62 therein and are biased into engagement with the free end portions of the respective hinge curls 62 to removably secure the cover 42 thereon for pivotal movement.

The covers 42 are provided with keyhole-shaped slots 74 and seal lances 76 adjacent their respective opposite ends, as best shown in FIGS. 10–13.

To provide good electrical connections for grounding purposes between duct sections and fittings such as the connector 22, end closure 51, and other fittings not shown, the fittings are provided with grounding screws 78 which are respectively held captive by fiber washers 79 (FIG. 4). When the fittings are connected to the duct sections, the screws 78 are screwed into respective threaded extrusions 80 provided in the duct sections adjacent opposite ends of the bottom portions 44.

When hinge-cover duct is desired, the connector 22 between two duct sections is preferably installed in two duct sections in the relative position shown in FIGS. 4 and 13, so that the connector cover 28 and the duct covers 42 open in the same direction. In this relative position, the captive nuts 38 cannot be shifted lengthwise of the slots 36 in the connector cover 28 sufficiently to align the heads of the screws 39 with the enlarged portions of the keyhole slots 74 in the duct covers 42 when the duct covers are closed.

When screw-cover duct is desired, the connector 22 is installed in two duct sections in the relative position shown in FIGS. 10–12, so that the connector cover 28 and the duct covers 42 open in opposite directions. In this relative position, the captive nuts 38 can be shifted lengthwise of the slots 36 in the connector cover 28 sufficiently to align the heads of the screws 39 with the enlarged portions of the keyhole slots 74 in the duct covers 42 when the duct covers are closed. The screws 39 can then be turned out to locate the heads thereof outwardly of the covers 42, as shown for one duct section in FIG. 12. The screws 39 and nuts 38 can then be shifted to align the heads of the screws with the narrow portions of the keyhole slots 74 and the screws can then be tightened to secure the duct covers 42 to the connector cover 28. The duct covers 42 cannot then be opened without first loosening and shifting the screws 39, since they open in the opposite direction from the connector cover 28 in this relative position. If desired, the duct can be sealed by installation of sealing wires through the seal lances 76 on the duct covers 42 and through the seal lance 40 on the connector cover 28.

The covers 42 can be readily disconnected from their respective duct sections by pulling them off one hinge curl 62 at a time after first disengaging the respective hinge spring 64 by depressing the leg portion 71 thereof and bending the hinge spring to the dotted line position shown in FIG. 7.

It will be seen that a single lay-in duct construction has been provided which can be used either as hinge-cover duct or screw-cover duct.

Various modifications may be made in the structure shown and described without departing from the spirit and scope of the invention.

We claim:

1. A combination hinge-cover and screw-cover lay-in duct comprising a channel-shaped body portion and a flanged cover, a side portion of said body portion having an integral hinge portion and a movable hinge portion secured to said side portion and cooperable with said integral hinge portion to removably secure said cover to said body portion for pivotal movement, a flange of said cover having a mounting aperture in which said integral hinge portion of said body portion is received and having an integral hinge bar adjacent said aperture, and releasable securing means releasably securing said cover in closed position on said body portion to prevent opening pivotal movement of said cover without prior release of said releasable securing means.

2. A lay-in duct section comprising a flanged cover and a channel-shaped body portion having a hinge curl extending outwardly from a side portion thereof through a flange of said cover and a resiliently deformable hinge lock member secured to the inner surface of said side portion and substantially engaging said hinge curl to removably secure said flanged cover thereon for pivotal movement.

3. A combination hinge-cover and screw-cover lay-in duct comprising a pair of aligned duct sections and a connector connecting said duct sections, said duct sections each including a channel-shaped body portion and a duct cover removably secured thereto for opening and closing pivotal movement, said connector including a channel-shaped body portion and a connector cover connected thereto for opening and closing pivotal movement in directions respectively opposite to the directions of opening and closing pivotal movement of said duct covers, and a pair of releasable securing means respectively releasably securing said duct covers to said connector cover in the closed positions thereof to prevent opening pivotal movement of one of said duct covers without prior release of the respective releasable securing means.

4. A lay-in duct as claimed in claim 3, wherein the releasable securing means at each connection between a duct cover and said connector cover is captive on one of said covers.

5. A lay-in duct as claimed in claim 3, wherein each of said releasable securing means is captive on said connector cover.

6. A combination hinge-cover and screw-cover lay-in duct comprising a pair of aligned duct sections and a connector connecting said duct sections, said duct sections each including a flanged cover and a channel-shaped body portion having a hinge curl extending outwardly from a side portion thereof through a flange of said cover and a resiliently deformable hinge lock member secured to the inner surface of said side portion and substantially engaging said hinge curl to removably secure said flanged cover thereon for opening and closing pivotal movement, said connector including a channel-shaped body portion and a connector cover connected thereto for opening and closing pivotal movement in directions respectively opposite to the directions of opening and closing pivotal movement of said flanged covers, and a pair of releasable securing means respectively releasably securing said flanged covers to said connector cover in the closed positions thereof to prevent opening pivotal movement of one of said flanged covers without prior release of the respective releasable securing means.

7. A lay-in duct as claimed in claim 6, wherein the releasable securing means at each connection between a flanged cover and said connector cover is captive on one of said covers.

8. A lay-in duct as claimed in claim 6, wherein each of said releasable securing means is captive on said connector cover.

9. A combination hinge-cover and screw-cover lay-in duct comprising a pair of aligned duct sections and a connector connecting said duct sections and disposable therein in either of two predetermined positions relative thereto, said duct sections each including a channel-shaped body portion and a duct cover removably secured thereto for opening and closing pivotal movement, said connector including a channel-shaped body portion and a connector cover connected thereto for opening and closing pivotal movement in directions respectively opposite to the directions of opening and closing pivotal movement of said duct covers when said connector is disposed in said duct sections in one of its said predetermined relative positions, and a pair of releasable securing means respectively releasably securing said duct covers to said connector cover in the closed positions thereof when said connector is in said one predetermined relative position to prevent opening pivotal movement of one of said duct covers without prior release of the respective releasable securing means, said connector cover opening and closing respectively in the same directions as the directions of opening and closing movement of said duct covers when said connector is disposed in said duct sections in the other of its said predetermined relative positions.

10. A lay-in duct as claimed in claim 9, wherein the releasable securing means at each connection between a duct cover and said connector cover is captive on one of said covers.

11. A lay-in duct as claimed in claim 9, wherein each of said releasable securing means is captive on said connector cover.

12. A combination hinge-cover and screw-cover lay-in duct comprising a pair of aligned duct sections and a connector connecting said duct sections and disposable therein in either of two predetermined positions relative thereto, said duct sections each including a flanged cover and a channel-shaped body portion having a hinge curl extending outwardly from a side portion thereof through a flange of said cover and a resiliently deformable hinge lock member secured to the inner surface of said side portion and substantially engaging said hinge curl to removably secure said flanged cover thereon for opening and closing pivotal movement, said connector including a channel-shaped body portion and a connector cover connected thereto for opening and closing pivotal movement in directions respectively opposite to the directions of opening and closing pivotal movement of said flanged covers when said connector is disposed in said duct sections in one of its said predetermined relative positions, and a pair of releasable securing means respectively releasably securing said flanged covers to said connector cover in the closed positions thereof when said connector is in said one predetermined relative position to prevent opening pivotal movement of one of said flanged covers without prior release of the respective releasable securing means, said connector cover opening and closing respectively in the same directions as the directions of opening and closing movement of said flanged covers when said connector is disposed in said duct sections in the other of its said predetermined relative positions.

13. A lay-in duct as claimed in claim 12, wherein the releasable securing means at each connection between a flanged cover and said connector cover is captive on one of said covers.

14. A lay-in duct as claimed in claim 12, wherein each of said releasable securing means is captive on said connector cover.

15. A combination hinge-cover and screw-cover lay-in duct comprising a pair of aligned duct sections and a connector disposed in and connecting said duct sections, said duct sections each including a channel-shaped body portion and a duct cover removably secured thereto for opening and closing pivotal movement, said connector including a channel-shaped body portion and a connector cover connected thereto for opening and closing pivotal movement in directions respectively opposite to the directions of opening and closing pivotal movement of said duct covers, said connector cover having a pair of captive nuts and screws, each nut and its associated screw being shiftably mounted on said connector cover for movement to either of two predetermined positions relative thereto, said duct covers each having a slot therein cooperable with a respective one of said screws, and said slots each having an enlarged portion through which the head of the respective screw may pass when the respective screw is in one of its said predetermined relative positions and a narrower portion in which the shank portion of the respective screw may be transversely received when the respective screw is shifted to the other of its said predetermined relative positions.

16. A combination hinge-cover and screw-cover lay-in duct comprising a pair of aligned duct sections and a connector disposed in and connecting said duct sections, said duct sections each including a flanged cover and a channel-shaped body portion having a hinge curl extending outwardly from a side portion thereof through a flange of said cover and a resiliently deformable hinge lock member secured to the inner surface of said side portion and substantially engaging said hinge curl to removably secure said flanged cover thereon for opening and closing pivotal movement, said connector including a channel-shaped body portion and a connector cover connected thereto for opening and closing pivotal movement in directions respectively opposite to the directions of opening and closing pivotal movement of said flanged covers, said connector cover having a pair of captive nuts and screws, each nut and its associated screw being shiftably mounted on said connector cover for movement to either of two predetermined positions relative thereto, said flanged covers of said duct sections each having a slot therein cooperable with a respective one of said screws, and said slots each having an enlarged portion through which the head of the respective screw may pass when the respective screw is in one of its said predetermined relative positions and a narrower portion in which the shank portion of the respective screw may be transversely received when the respective screw is shifted to the other of its said predetermined relative positions.

17. A combination hinge-cover and screw-cover lay-in duct comprising a pair of aligned duct sections and a connector connecting said duct sections and disposable therein in either of two predetermined positions relative thereto, said duct sections each including a channel-shaped body portion and a duct cover removably secured thereto for opening and closing pivotal movement, said connector including a channel-shaped body portion and a connector cover connected thereto for opening and closing pivotal movement in directions respectively opposite to the directions of opening and closing pivotal movement of said duct covers when said connector is disposed in said duct sections in one of its said predetermined relative positions, said connector cover having a pair of captive nuts and screws, each nut and its associated screw being shiftably mounted on said connector cover for movement to either of two predetermined positions relative thereto, said duct covers each having a slot therein cooperable with a respective one of said screws, said slots each having an enlarged portion through which the head of the respective screw may pass when said connector is in said one predetermined relative position and the respective screw is in one of its said predetermined relative positions and a narrower portion in which the shank portion of the respective screw may be transversely received when the respective screw is shifted to the other of its said predetermined relative positions, and said connector cover opening and closing respectively in the same directions as the directions of opening and closing movement of said duct covers when said connector is disposed in said duct sections in the other of its said predetermined relative positions.

18. A combination hinge-cover and screw-cover lay-in duct comprising a pair of aligned duct sections and a connector connecting said duct sections and disposable therein in either of two predetermined positions relative thereto, said duct sections each including a flanged cover and a channel-shaped body portion having a hinge curl extending outwardly from a side portion thereof through a flange of said cover and a resiliently deformable hinge lock member secured to the inner surface of said side portion and substantially engaging said hinge curl to removably secure said flanged cover thereon for opening and closing pivotal movement, said connector including a channel-shaped body portion and a connector cover connected thereto for opening and closing pivotal movement in directions respectively opposite to the directions of opening and closing pivotal movement of said flanged covers when said connector is disposed in said duct sections in one of its said predetermined relative positions, said connector cover having a pair of captive nuts and screws, each nut and its associated screw being shiftably mounted on said connector cover for movement to either of two predetermined positions relative thereto, said flanged covers of said duct sections each having a slot therein cooperable with a respective one of said screws, said slots each having an enlarged portion through which the head of the respective screw may pass when said connector is in said one predetermined relative position and the respective screw is in one of its said predetermined relative positions and a narrower portion in which the shank portion of the respective screw may be transversely received when the respective screw is shifted to the other of its said predetermined relative positions, and said connector cover opening and closing respectively in the same directions as the directions of opening and closing pivotal movement of said flanged covers when said connector is disposed in said duct sections in the other of its said predetermined relative positions.

References Cited by the Examiner

UNITED STATES PATENTS

| | | | |
|---|---|---|---|
| 205,908 | 7/1878 | Rowlett | 138—165 X |
| 2,797,720 | 7/1957 | Mann | 151—41.75 |
| 2,905,201 | 9/1959 | McNaughton | 138—159 X |
| 2,917,083 | 12/1959 | Duvall et al. | 138—157 X |
| 2,956,587 | 10/1960 | Fisher | 138—158 X |

FOREIGN PATENTS 1,944  5/1876  Great Britain.

LAVERNE D. GEIGER, *Primary Examiner.*

T. L. MOOREHEAD, *Assistant Examiner.*